US012629694B1

(12) United States Patent
Obenauer

(10) Patent No.: US 12,629,694 B1
(45) Date of Patent: May 19, 2026

(54) PORTABLE COOKING SYSTEM AND APPARATUS FOR PANNING FOR GOLD

(71) Applicant: James Scott Obenauer, Billings, MT (US)

(72) Inventor: James Scott Obenauer, Billings, MT (US)

( * ) Notice: Subject to any disclaimer, the term of this patent is extended or adjusted under 35 U.S.C. 154(b) by 0 days.

(21) Appl. No.: 19/190,409

(22) Filed: Apr. 25, 2025

(51) Int. Cl.

| | |
|---|---|
| ***B03B 7/00*** | (2006.01) |
| ***B03B 5/40*** | (2006.01) |
| ***F24C 1/16*** | (2021.01) |

(52) U.S. Cl.
CPC .................. *B03B 7/00* (2013.01); *B03B 5/40* (2013.01); *F24C 1/16* (2013.01)

(58) Field of Classification Search
CPC ...... B03B 5/26; B03B 5/40; F24C 1/16; A47J 37/0763
USPC ....... 209/446, 447, 506, 508; 126/9 R, 25 R, 126/50
See application file for complete search history.

(56) References Cited

U.S. PATENT DOCUMENTS

| | | | |
|---|---|---|---|
| 3,791,368 | A | 2/1974 | Hunt |
| 4,210,072 | A | 7/1980 | Pedrini |
| 4,508,096 | A | 4/1985 | Slattery |
| 4,922,079 | A | 5/1990 | Bowen et al. |
| 7,188,617 | B1 | 3/2007 | Umbrianna |
| 2006/0225725 | A1 | 10/2006 | Rinaldo |
| 2019/0191929 | A1 | 6/2019 | Soubra |

FOREIGN PATENT DOCUMENTS

| | | | | |
|---|---|---|---|---|
| CA | 2321121 | A1 * | 4/2002 | ............. A47J 37/07 |
| CN | 210043800 | U | 2/2020 | |
| DE | 2429839 | A1 | 1/1975 | |
| DE | 29613504 | U1 | 9/1996 | |
| DE | 20306625 | U1 * | 8/2003 | .......... A47J 37/0704 |
| DE | 202017107928 | U1 | 1/2018 | |
| GB | 2185876 | A | 8/1987 | |
| KR | 102236131 | B1 | 4/2021 | |

OTHER PUBLICATIONS

Gestelltechnik , "Grill or Barbecue Which can be Folded Together" (English Translation), Aug. 28, 2003, worldwide.espacenet.com (Year: 2003).*

* cited by examiner

*Primary Examiner* — Molly K Devine
(74) *Attorney, Agent, or Firm* — Antoinette M. Tease

(57) ABSTRACT

A portable cooking system and apparatus for panning gold including a base member with a V-shaped trough having two ledges and a supporting member disposed on each end; a fire box that fits within the V-shaped trough; a steamer basket that fits within the base member with ledges extending along the top sides of the steamer basket; a grill top that is configured to rest on top of the ledges of the steamer basket and/or base member; and a cover with a handles. The ledges of the steamer basket rest on top of the ledges of the base member. Rails on the cover are configured to slide underneath and around the ledges on the base member and steamer basket. A sluice bar is disposed on an inside wall of the fire box and comprises a plurality of horizontal slots arranged in offset rows with protrusions extending from the bottom edge.

9 Claims, 16 Drawing Sheets

PORTABLE COOKING SYSTEM AND APPARATUS FOR PANNING FOR GOLD

BACKGROUND OF THE INVENTION

1. Field of the Invention

The present invention is both a portable cooking system and an apparatus for panning for gold. The invention may be used indoors or outdoors but is particularly intended for use by hunters and outdoor recreationalists.

2. Description of the Related Art

The present invention is a cooking system that is portable, lightweight, and self-contained. It can be used in the field or at home, and it has multiple cooking and/or grilling uses, as described more fully below. The present invention can also be used to pan for gold when camping, hunting, fishing, backpacking, hiking, or engaging in similar outdoor activities. All of the component parts of the invention are engineered to fit snugly into a single compartment that locks when not in use. There is no system currently on the market or in existence that incorporates the structural features and dual functionality of the present invention.

U.S. Patent Application Pub. No. 2019/0291929 (Verbrugge et al.) discloses a portable barbecue including a firebox, a grate, and a cover. The firebox and cover are coupled together for portability. When in use, the cover acts as a stand to support the firebox, and when not in use, the cover encloses the firebox and grate. A handle is attached to one end of the firebox. The firebox is rectangular in shape with an open top.

U.S. Pat. No. 3,791,368 (Hunt, 1974) describes a multi-purpose cooking assembly that serves as a stove, griddle, toaster, pressure cooker, and charcoal broiler. The assembly is contained within a portable carrying case that resembles a small rectangular suitcase. The assembly includes a supporting cooking base with four upright sides with multiple small ventilation openings, a solid base with small upwardly projecting receivers, retractable and pivotable supporting legs, and an open top. The invention includes an assembly of gas burners and supply lines that are removably interfitted with the small upwardly projecting receivers on the solid base. The invention also includes a removable propane gas container and valve, a removable charcoal briquet carrier, a removable griddle with a surrounding grease collection trough, a removable grill, and an assortment of cooking accessories, all of which fit within the carrying case.

U.S. Pat. No. 4,922,079 (Bowen et al., 1990) provides a combination bake oven/steamer/broiler cartridge for cooking food on a cooktop. The cartridge is placed over a heat source and inserted into a pan. An adjustable rack allows the invention to be used as a bake oven, Water can be added to the bottom of the cartridge, and a steaming pan can be inserted into the cartridge, for the invention to serve as a steamer. A ceramic or glass container may be substituted for the steaming pan, in which case the invention acts as a warming device. To use the invention as a broiler, a special cover containing heating elements is situated over the adjustable rack.

U.S. Patent Application Pub. No. 2006/0225725 (Rinaldo) describes a portable and collapsible cooking unit that is easily transported, disassembled and reassembled. The invention is made up of a slotted cooking member with side walls, a bottom wall and a rim around its upper periphery, the rim having at least one slot; a bottom housing unit that is configured to hold charcoal or wood pieces and that fits beneath the cooking member; a metal frame with hinged legs and an opening large enough to accommodate the cooking member and bottom housing unit; and a separate utensil that is configured to be attached to the slot in the rim of the cooking member. When the invention is in use, the booking member and the bottom housing unit are suspended within the metal frame.

U.S. Pat. No. 4,508,096 (Slattery, 1985) illustrates a cooker assembly that is comprised of a rectangular fire pan, a cover, a pair of supporting end plates, a pair of side plates, and a grill. The cover and the supporting end plates are secured to the fire pan with fasteners. Transverse ribs on the end plates provide support for the grill at different levels above the fire pan. The front and rear side plates fit into recesses at the edges of the end plates to form a baking chamber. The cover may enclose the top of the assembly partially or completely for smoking or baking purposes.

U.S. Pat. No. 7,188,617 (O'Blenes, 2007) discloses a portable outdoor cooker that is particularly adapted for use on boats. The invention is a cooker unit with an open top and a propane gas log positioned inside of it, a plurality of legs that are specifically adapted for mounting the unit on a boat rail, a two-sided removable grill and griddle unit, a removable baking and steaming pan, and a removable cover. The cooker unit is rectangular in shape. The legs are pivotable and releasably attached to the cooker unit with clips. The front legs are bent at an approximate midpoint to constitute a support potion that engages a boat rail holder or a ground surface and an attachment portion that is telescopically attached to a tube on the bottom of the cooker unit.

U.S. Pat. No. 4,210,072 (Pedrini, 1980) involves an apparatus for heating or cooking food in which a plate forms a hot horizontal surface, a heating source is situated underneath the plate, and a cover is situated above the plate and configured to define a mainly closed space. The plate has a first essentially flat surface and a second ribbed surface. Conduit means around the perimeter of the plate are configured to allow direct circulation of hot air from the heating means to the food placed on the flat surface of the plate when the plate is in a first position (used as an oven). When the plate is inverted and in a second position (used as a grill), hot air is inhibited from rising through the conduit means.

BRIEF SUMMARY OF THE INVENTION

The present invention is a portable cooking system and apparatus for panning gold comprising a base member having an open top, the base member comprised of a V-shaped trough having first and second longitudinal ends, the base member further comprised of supporting member disposed on each of the first and second longitudinal ends of the V-shaped trough; a fire box that is configured to fit within the V-shaped trough of the base member; a steamer basket that is configured to fit within the base member on top of the fire box, the steamer basket comprising two side walls, each of which has a top edge, and a ledge that extends outwardly from and along the top edge of each of the two side walls of the steamer basket; a grill top that is configured to rest on top of the ledges of the steamer basket and/or the ledges of the V-shaped trough of the base member; and a cover having first and second ends and a handle disposed on each of the first and second ends of the cover; wherein the V-shaped trough is comprised of two flat plates with bottom edges, and wherein the bottom edges of the two flat plates of the V-shaped trough meet to form a center line of the V-shaped trough; wherein a ledge extends outwardly from and along a top edge of each of the two side walls of the V-shaped trough of the base member; and wherein the ledges of the steamer basket are configured to rest on top of the ledges of the base member.

In a preferred embodiment, the base member further comprises first and second side walls, each supporting member has a top edge, and the top edge of each supporting member is connected to a top edge of one of the two side walls of the base member. Preferably, the cover is generally rectangular in shape and comprised of a flat top plate, two side walls, and two end walls; wherein each of the two end walls of the cover comprises a handle; wherein each of the two side walls of the cover has a top part and a bottom part with first and second ends; wherein the first end of the bottom part of each side wall of the cover is rounded; wherein a rail extends inwardly from a bottom edge of the bottom part of each side wall of the cover and is configured to engage slidably with the ledge of the V-shaped trough of the base member; and wherein the second end of the bottom part of each side wall of the cover is configured to abut up against one end of the ledge on the V-shaped trough of the base member. Each rail is preferably parallel to the flat top plate of the cover, In a preferred embodiment, each supporting member comprises a horizontal slot that is configured to allow a person's fingers to pass through it. The invention preferably further comprises a recess in a center of each ledge of the V-shaped trough of the base member. Preferably, each supporting member has two bottom corners, and the bottom corner of each supporting member is bent inward. In another preferred embodiment, the flat plates of the V-shaped trough are at a ninety (90)-degree angle relative to one another.

In a preferred embodiment, the steamer basket is in the shape of a trough with a flat bottom piece, two end walls, and two side walls that extend upwardly and outwardly from the flat bottom piece at an angle of approximately forty-five degrees. Preferably, the flat bottom piece and the two side walls of the steamer basket comprise a plurality of laterally extending slots. The grill top is preferably comprised of a single flat sheet of metal that is bent to form a downwardly extending V-shaped channel in a center of the grill top. In another preferred embodiment, the grill top comprises a plurality of lateral slots that are arranged into four quadrants with no slots in the V-shaped channel in the center of the grill top. In yet another preferred embodiment, the rails on the cover are configured to slide underneath the ledges on the base member.

In a preferred embodiment, the invention further comprises a sluice bar that is configured to fit along an inside surface of one of the two side walls of the V-shaped trough of the base member; wherein the sluice bar comprises a lip along a top edge of the sluice bar, the lip being configured to rest on top of the ledge along one of the two side walls of the V-shaped trough of the base member. Preferably, the sluice bar comprises three rows of longitudinal slots, each row of longitudinal slots being comprised of at least three longitudinal slots; wherein the longitudinal slots in a middle row are offset from the longitudinal slots in a top row and the longitudinal slots in a bottom row. The sluice bar preferably comprises a plurality of protrusions that extend downwardly in between each longitudinal slot on the bottom row and at each end of the sluice bar.

REFERENCE NUMBERS

Figure 1:
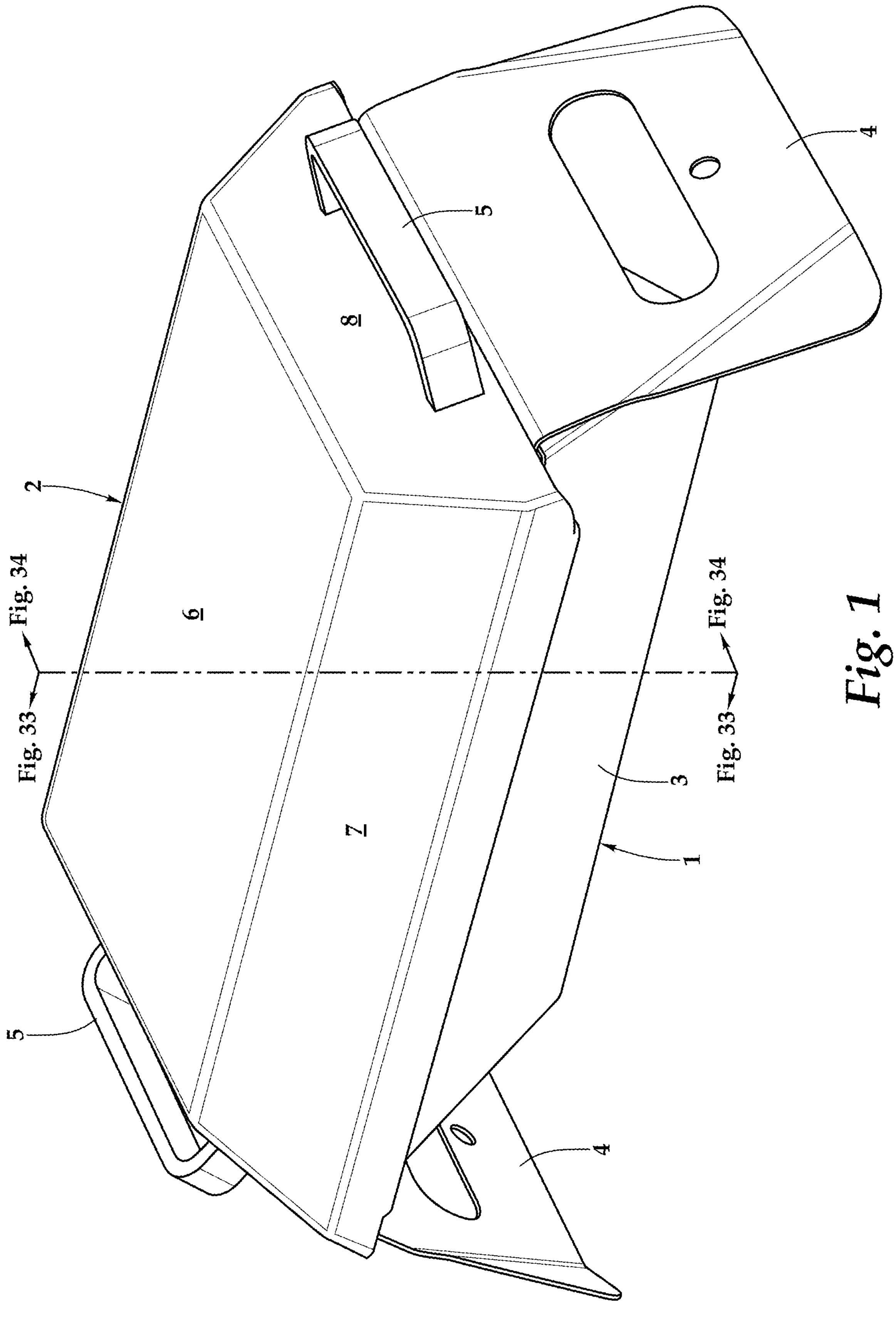
FIG. 1 is a perspective view of the present invention in a fully assembled position.

1 Base member
1 Cover
3 V-shaped trough
3*a* Flat plate (of V-shaped trough)
4 Supporting member
4*a* Top edge (of supporting member)
5 Handle
6 Flat top plate
7 Side wall (of cover)
7*a* Top part (of side wall)
7*b* Bottom part (of side wall)
8 End wall (of base member)
9 Rail
10 Ledge
10*a* Recess (in ledge)
11 Screw
12 Side wall (of base member)
13 Slot (in side wall)
14 Fire box
14*a* Flat plates (of fire box)
15 End wall (of fire box)
16 Hole (in handle)
17 Steamer basket
18 Flat bottom piece (of steamer basket)
19 Side wall (of steamer basket)
20 Slot (in flat bottom piece, side wall of steamer basket)
21 End wall (of steamer basket)
22 Ledge (of steamer basket)
23 Grill top
24 V-shaped channel (in grill top)
25 Lateral slots (in grill top)
26 Sluice bar
27 Clip

28 Slot (in sluice bar)
29 Lip (of sluice bar)
30 Protrusion (on sluice bar)

DETAILED DESCRIPTION OF INVENTION

FIG. 1 is a perspective view of the present invention in a fully assembled position. As shown in this figure, the present invention is a compact, portable unit comprised of a base member 1 (also referred to as the "baking pan") and a cover 2 (also referred to as the "lid"). The base member 1 is comprised of a V-shaped trough 3 with a supporting member 4 on each longitudinal end of the V-shaped trough 3. The supporting members 4 are configured so that the base member 1 never comes into contact with the underlying surface (for example, a countertop, cutting board or table). As explained more fully below, the cover 2 is configured to slide onto the top of the base member 1, thereby enclosing the contents inside of the base member 1. The cover 2 has two handles 5, one on each longitudinal end of the cover 2.

Figure 2:
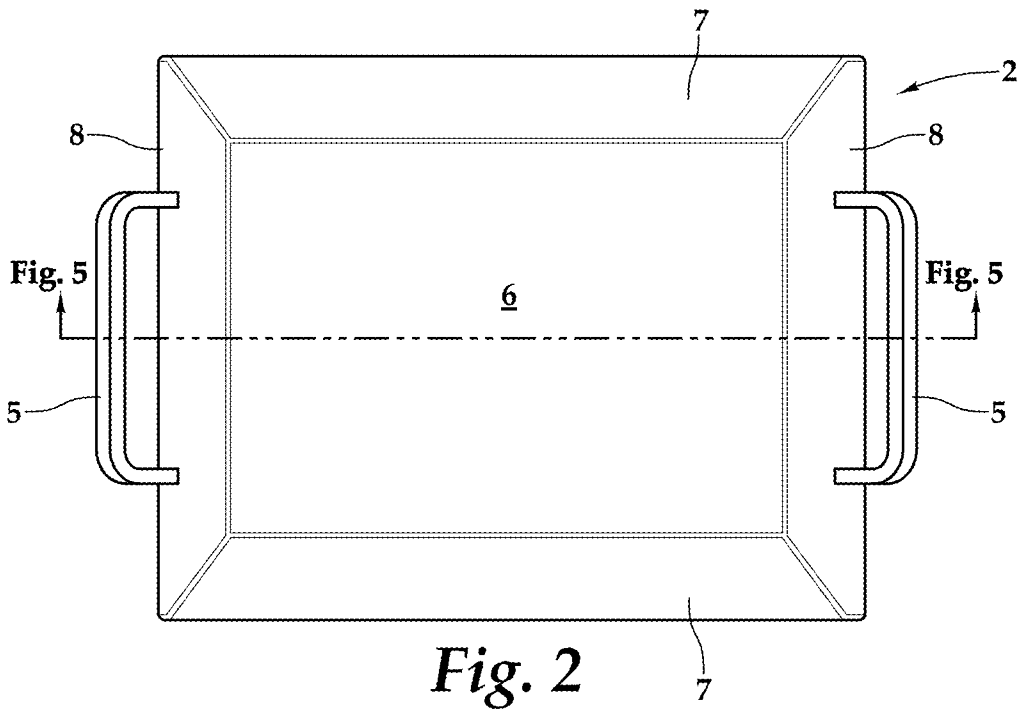
FIG. 2 is a top view of the cover of the present invention.

FIG. 2 is a top view of the cover of the present invention. As shown in this figure, the cover 2 is generally rectangular in shape and comprised of a flat top plate 6, two side walls 7, and two end walls 8. The handles 5 are situated on the outside of the end plates 8. The cover 2 may also be inverted (not shown) and placed on top of the fire box 14 to act as a frying or sauce pan.

Figure 3:
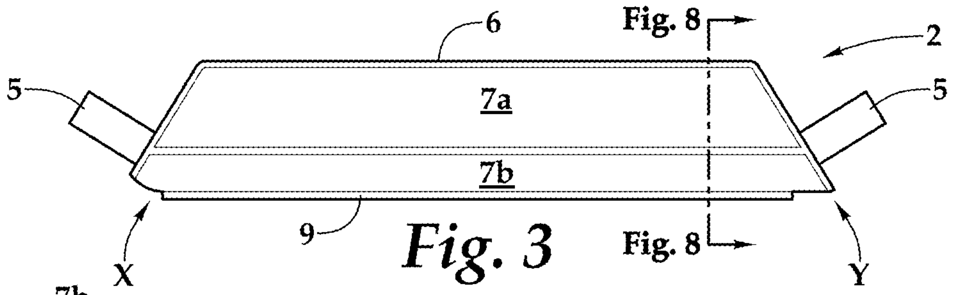
FIG. 3 is a side view of the cover of the present invention.

FIG. 3 is a side view of the cover of the present invention, Each side wall 7 is comprised of a top part 7*a* and a bottom part 7*b*. Note that one end (designated with an "X" in this figure) of the bottom part 7*b* of the side wall 7 is rounded, and the other end (designated with a "Y" in this figure) of the bottom part 7*b* of the side wall 7 is pointed and terminates in a tip. This is to facilitate installation of the cover 2 on top of the base member 1 and to ensure that the unit is locked before it is picked up, as will be explained more fully below.

Figure 4:
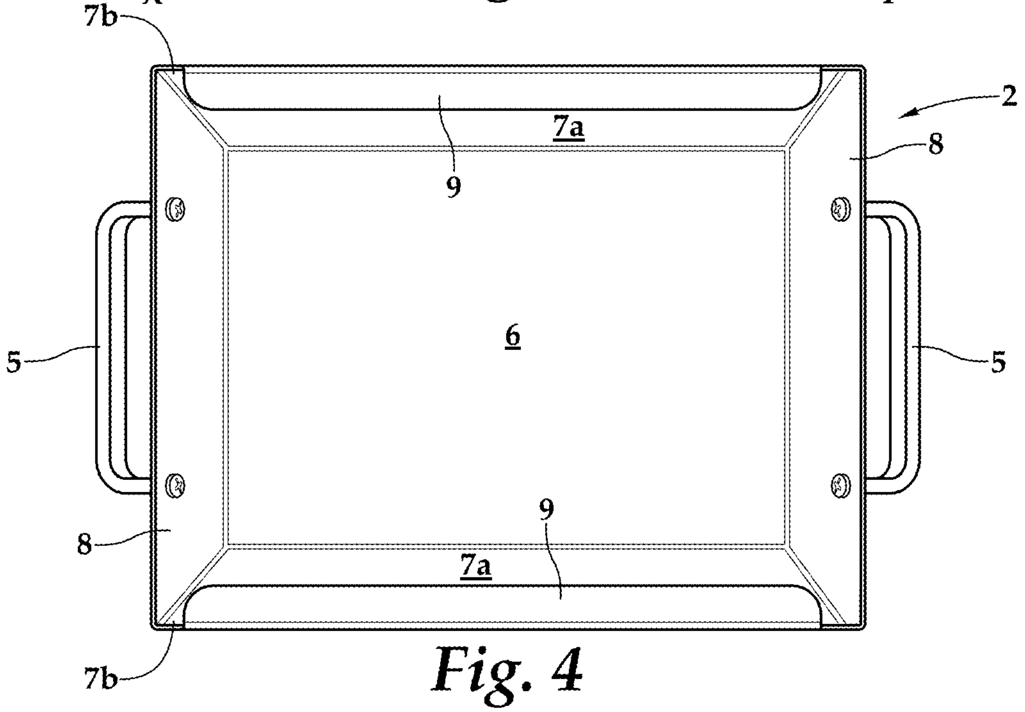
FIG. 4 is a bottom view of the cover of the present invention.

FIG. 4 is a bottom view of the cover of the present invention. As shown in this figure, a rail 9 extends inwardly from the bottom edge of the bottom part 7*b* of each side wall 7. This rail 9 engages slidably with a ledge 10 (see FIG. 9) on the base member 1, as explained below, when the unit is in a closed position. In a preferred embodiment, the rail 9 extends nearly the entire length of the side wall 7.

Figure 5:
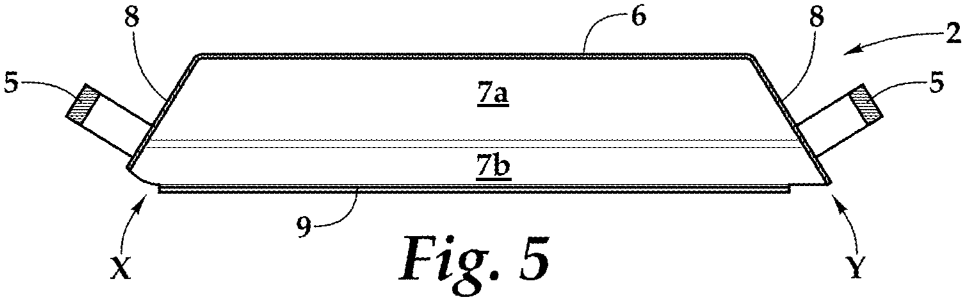
FIG. 5 is a section view of the cover taken at the line shown in FIG. 2.

FIG. 5 is a section view of the cover taken at the line shown in FIG. 2. As shown in this figure, the rail 9 is parallel to the flat top plate 6 of the cover 2.

Figure 6:
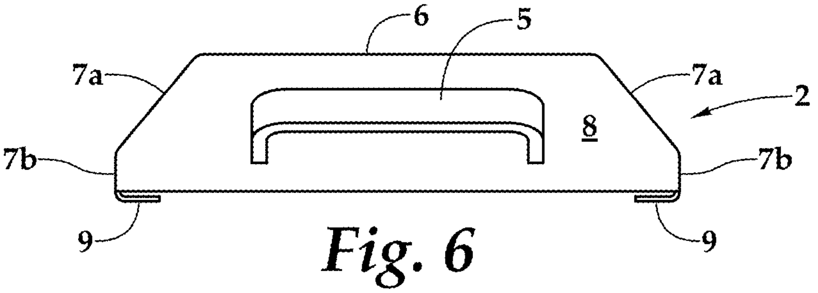
FIG. 6 is a first end view of the cover of the present invention.
Figure 7:
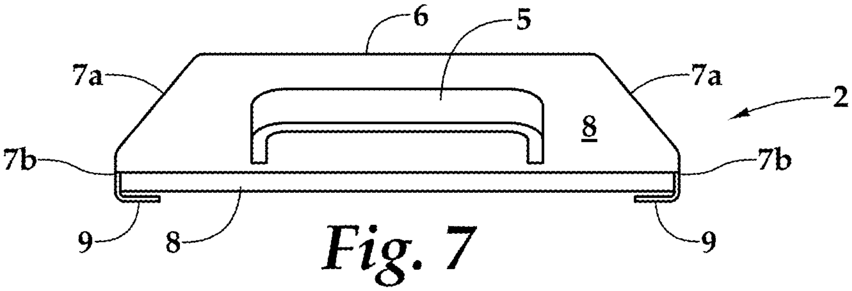
FIG. 7 is a second end view of the cover of the present invention.
Figure 8:
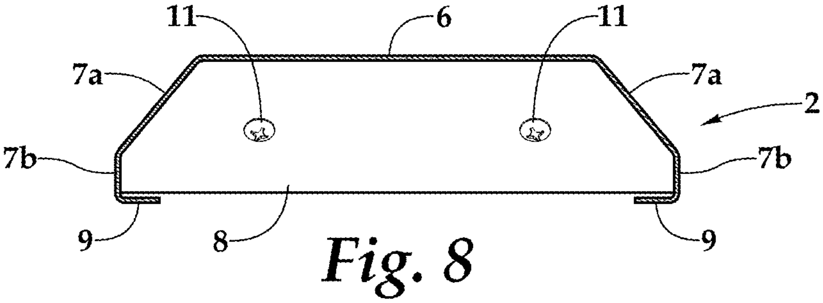
FIG. 8 is a section view of the cover of the present invention taken at the line shown in FIG. 3.

FIG. 6 is a first end view of the cover of the present invention. This figure shows that end of the cover 2 that is on the right-hand side in FIG. 5. FIG. 7 is a second end view of the cover of the present invention. This figure shows that end of the cover 2 that is on the left-hand side in FIG. 5. The difference between FIGS. 6 and 7 is that one end of the bottom part 7*b* of each side wall 7 is rounded, as noted above (see also FIG. 3), FIG. 8 is a section view of the cover of the present invention taken at the line shown in FIG. 3. As shown in this figure, the rails 9 extend slightly lower than the bottom end of each side wall 7 (see FIG. 8). The handles 5 are held in place with screws 11.

Figure 9:
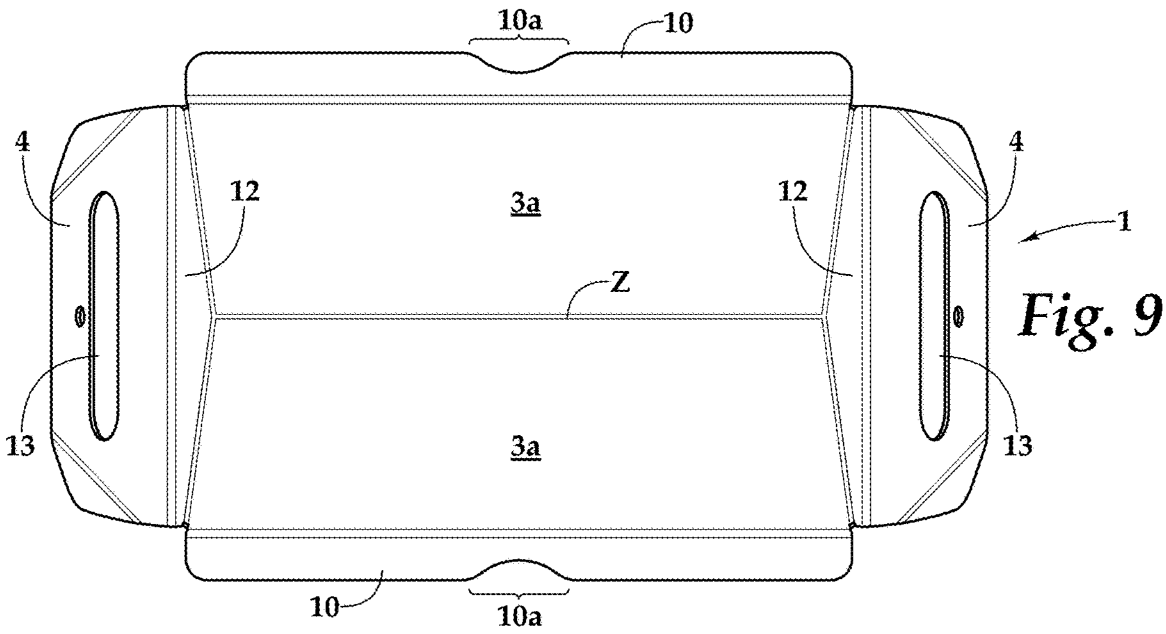
FIG. 9 is a top view of the base member of the present invention.

FIG. 9 is a top view of the base member of the present invention. This figure shows the V-shaped trough, which is comprised of two flat plates 3*a*, the bottom edges of which meet in the center of the V-shaped trough along a longitudinal line that is designated as "Z" in this figure. The base member further comprises first and second side walls 12. The top edge of each supporting member 4 is connected to the top edge of the side wall 12. Each supporting member 4 comprises a horizontal slot 13 that is configured to allow a person's fingers to pass through it. A ledge 10 extends outwardly from and along the top edge of each of the two side walls 12. A recess 10*a* in the center of each ledge 10 facilitates lifting of the steamer basket 17 out of the base member 1. In a preferred embodiment, a hole 16 in the handle situated directly underneath the center of the slot 13 can be used to attach a carabiner or similar implement or to hang the pan from a rope or cable.

Figure 10:
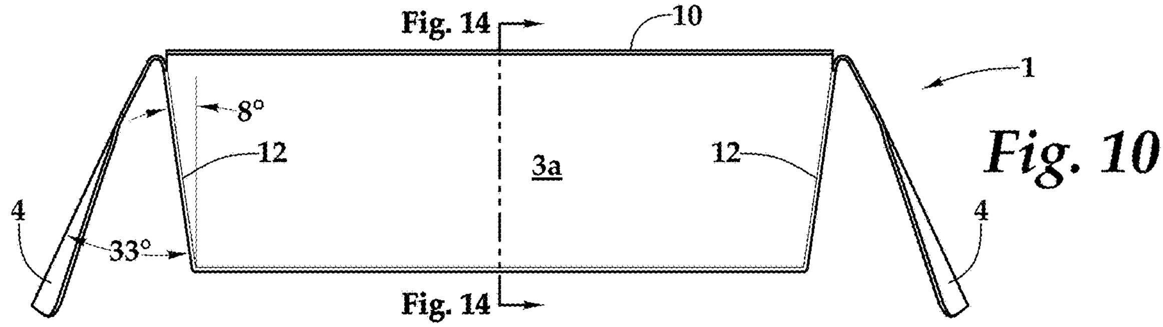
FIG. 10 is a side view of the base member of the present invention.
Figure 11:
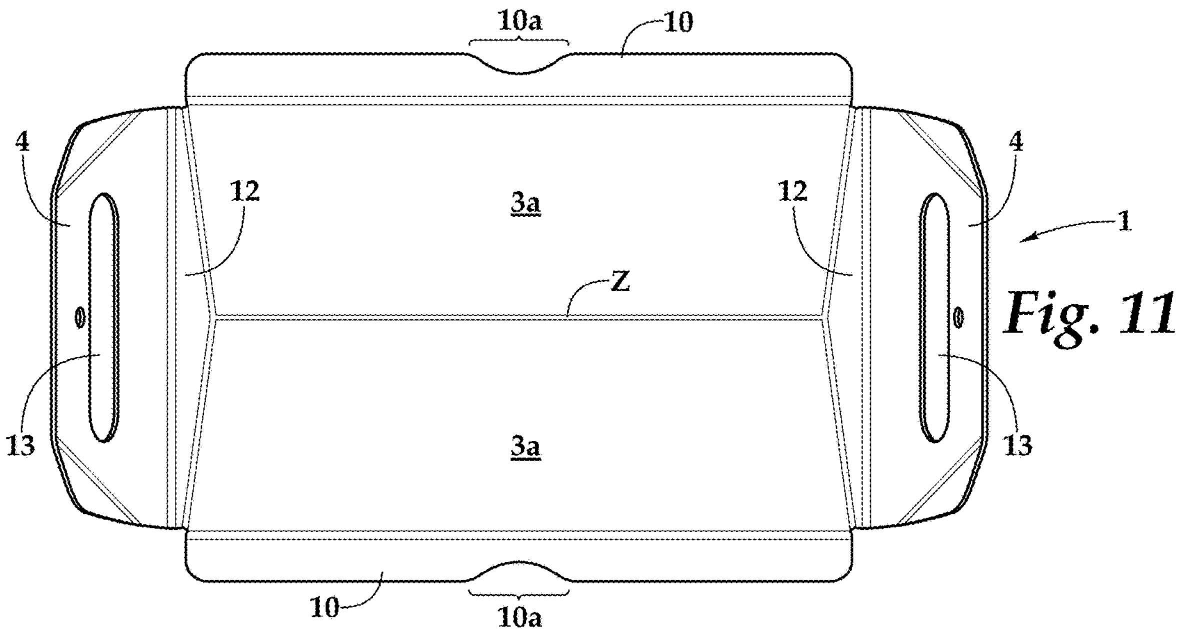
FIG. 11 is a bottom view of the base member of the present invention.

FIG. 10 is a side view of the base member of the present invention. As shown in this and the preceding figure, the bottom corner of each supporting member 4 is preferably bent inward to provide greater stability. As indicated in the figure, the side walls 12 are preferably tilted outward at an angle approximately equal to eight degrees) (8° so that the top end of the side wall is slightly farther from the center of the base member than the bottom end of the side wall. This angle preferably ranges from five to ten degrees. The supporting members are tilted away from the side walls 12 at an angle approximately equal to thirty-three (33°), as shown. This angle preferably ranges from twenty-five to thirty-five degrees. The base member 1 has an open top. FIG. 11 is a bottom view of the base member of the present invention.

Figure 12:
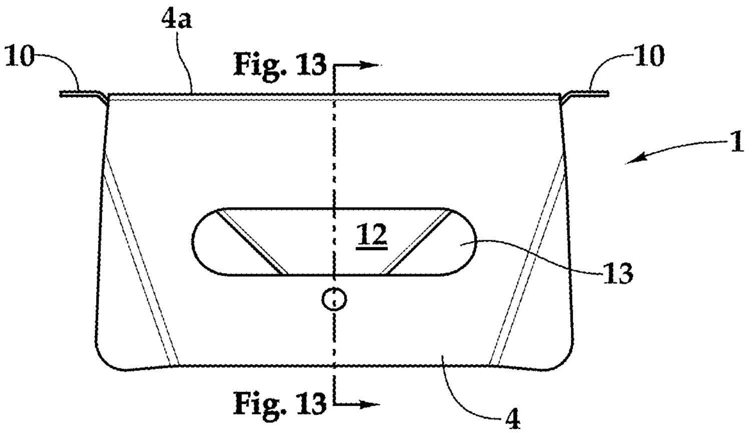
FIG. 12 is a side view of the base member of the present invention.

FIG. 12 is a side view of the base member of the present invention. This figure shows the top edge 4*a* of the supporting member 4, which is also the top edge of the side wall 12. Note that the side wall shown in this figure is actually the side wall 12 on the opposite end of the base member 1.

Figure 13:
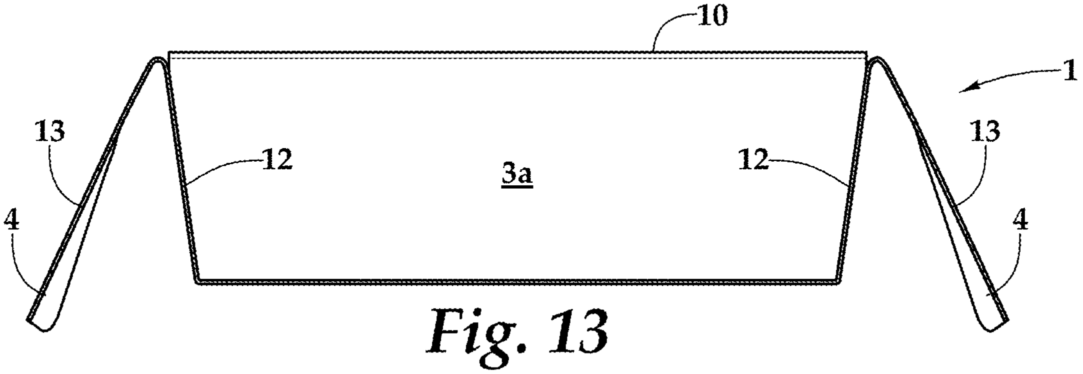
FIG. 13 is a section view of the base member of the present invention taken at the line shown in FIG. 12.
Figure 14:
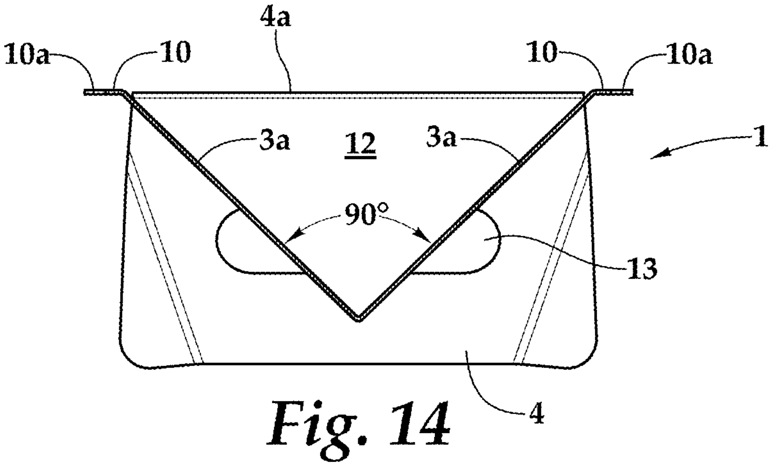
FIG. 14 is a section view of the base member taken at the line shown in FIG. 10.

FIG. 13 is a section view of the base member of the present invention taken at the line shown in FIG. 12. Note that the height of the base member 1 appears to be deeper in FIG. 13 than it does in FIG. 10; this is because the section view is taken along the bottom edge of the V-shaped trough 3, FIG. 14 is a section view of the base member taken at the line shown in FIG. 10. As shown in this figure, the flat plates 3*a* of the V-shaped trough 3 are preferably at a ninety-degree) (90° angle relative to one another.

Figure 15:
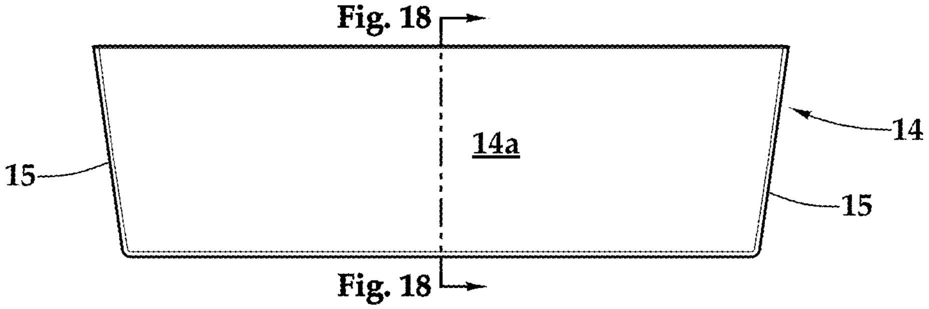
FIG. 15 is a side view of the fire box of the present invention.
Figure 16:
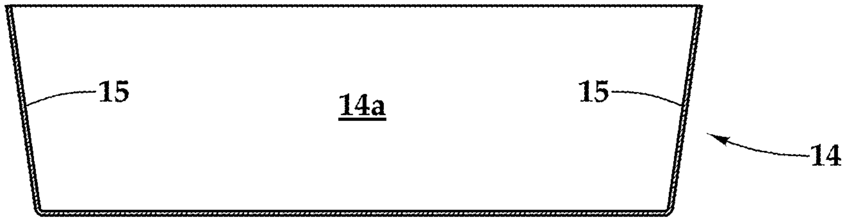
FIG. 16 is a section view of the fire box of the present invention taken at the line shown in FIG. 17.
Figure 17:
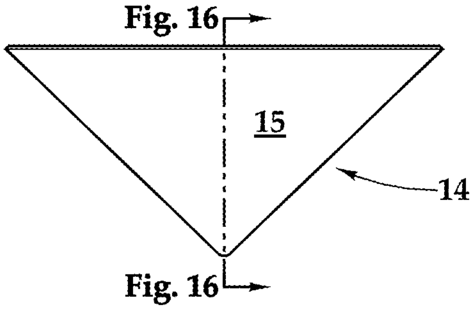
FIG. 17 is an end view of the fire box of the present invention.
Figure 18:
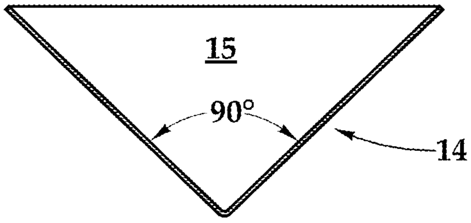
FIG. 18 is a section view of the fire box of the present invention taken at the line shown in FIG. 15.

FIG. 15 is a side view of the fire box of the present invention. FIG. 16 is a section view of the fire box of the present invention taken at the line shown in FIG. 17, FIG. 17 is an end view of the fire box of the present invention, and FIG. 18 is a section view of the fire box of the present invention taken at the line shown in FIG. 15. The fire box 14 is configured to fit within the V-shaped trough 3 of the base member 1, The fire box 14 itself is in the form of a V-shaped trough with two flat plates 14*a* that are joined together along their bottom edges, two end walls 15, and an open top. The two end walls 15 are splayed outward at the top, similar to the outward splaying of the end walls 12 of the base member 1 (see FIG. 10). The two flat plates 14*a* meet at an angle of approximately ninety degrees) (90°. The fire box 14 serves as a liner to protect the base member 1 while containing combustibles such as charcoal or wood for cooking or heating options.

Figure 19:
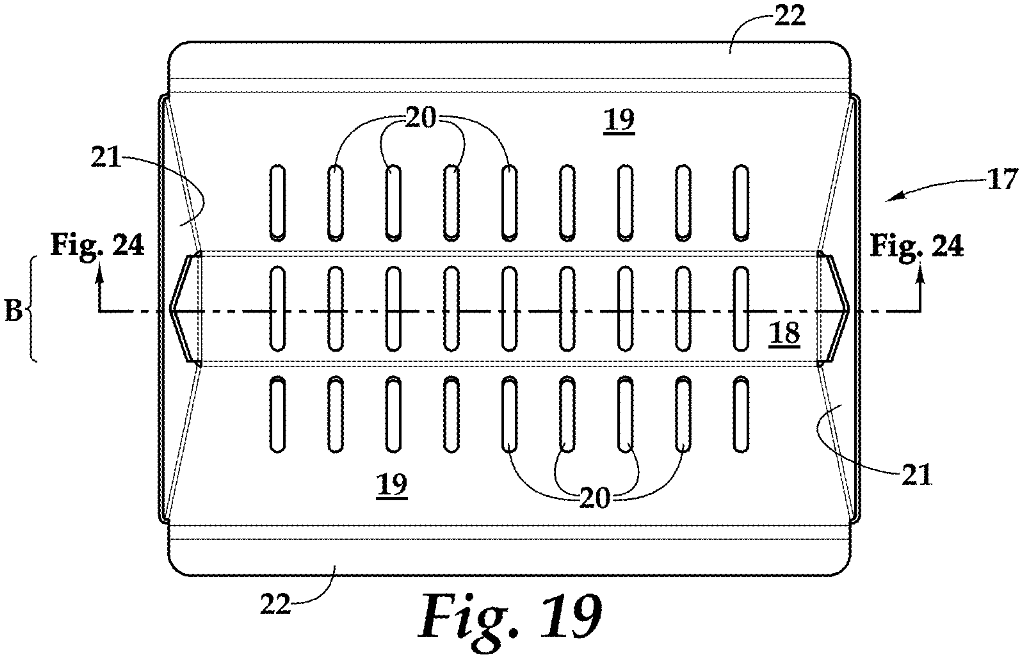
FIG. 19 is a top view of the steamer basket of the present invention.
Figure 20:
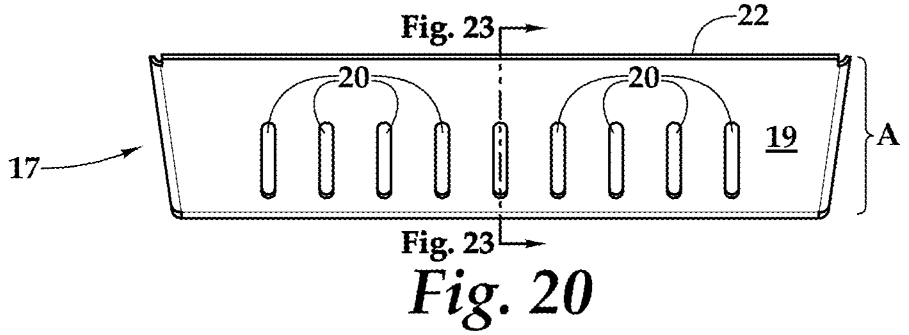
FIG. 20 is a side view of the steamer basket of the present invention.
Figure 21:
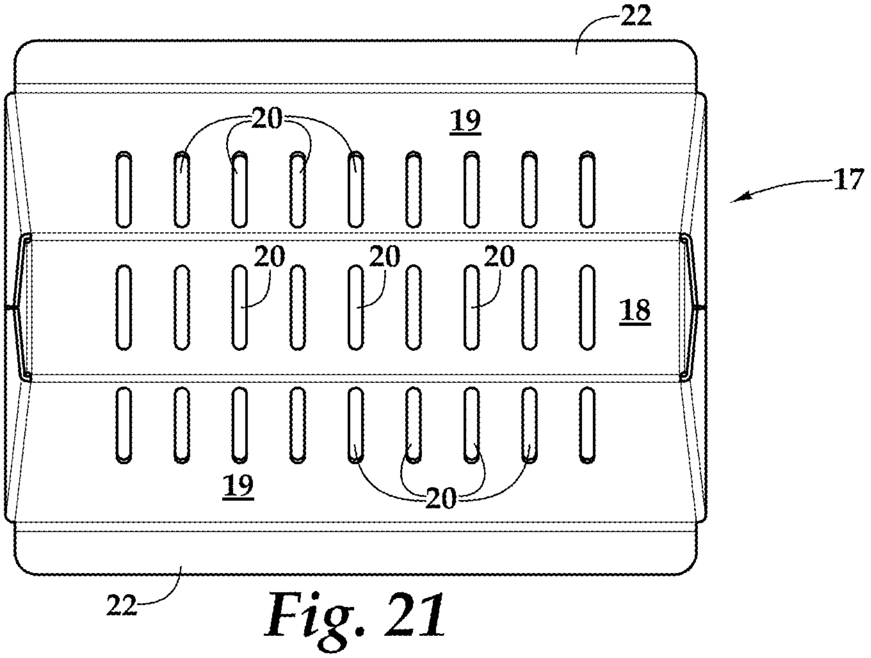
FIG. 21 is a bottom view of the steamer basket of the present invention.

FIG. 19 is a top view of the steamer basket of the present invention, FIG. 20 is a side view of the steamer basket of the present invention, and FIG. 21 is a bottom view of the steamer basket of the present invention. As shown in these figures, the steamer basket 17 is in the shape of a trough with a flat bottom piece 18 and two side walls 19 that extend upwardly and outwardly from the flat bottom piece 18 at an angle of approximately forty-five degrees) (45° (see FIG. 23). Each side wall 19 is approximately twice the width of the flat bottom piece 18 (compare "A" to "B" in FIGS. 19 and 20). The flat bottom piece 18 and each of the two sides walls 19 preferably comprise a plurality of laterally extending slots 20. Note that the slots 20 on the side walls 19 only extend about two-third (2/3) of the way up the side wall. The steamer basket 17 also comprises an end wall 21 on each end of the steamer basket. A ledge 22 extends outwardly from and along approximately the entire length of the top edge of each side wall 19. The ledges 22 are configured to rest upon the ledges 10 when the invention is fully assembled.

Figure 22:
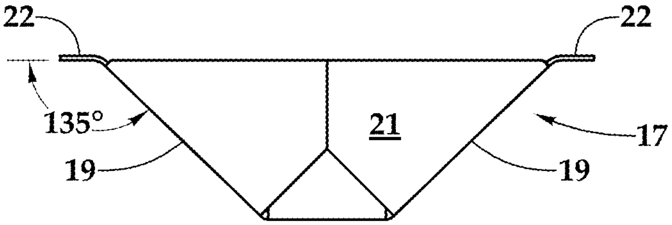
FIG. 22 is an end view of the steamer basket of the present invention.
Figure 23:
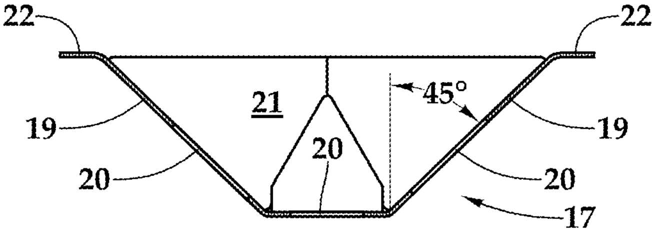
FIG. 23 is a section view of the steamer basket of the present invention taken at the line shown in FIG. 20.
Figure 24:
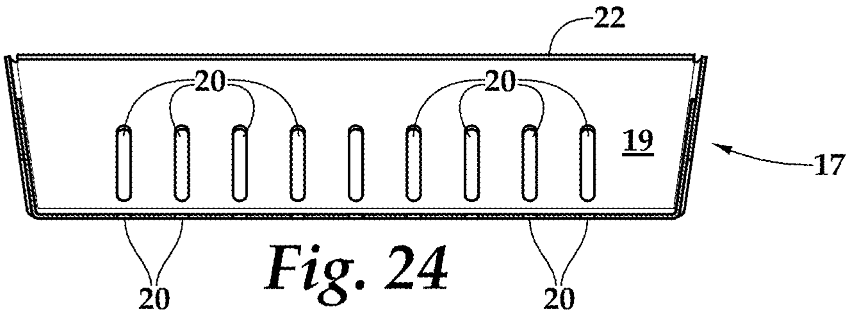
FIG. 24 is a section view of the steamer basket of the present invention taken at the line shown in FIG. 19.

FIG. 22 is an end view of the steamer basket of the present invention. As shown in this figure, the ledges 22 are at an angle of approximately one hundred thirty-five degrees) (135° relative to the side walls 19, FIG. 23 is a section view of the steamer basket of the present invention taken at the line shown in FIG. 20, and FIG. 24 is a section view of the steamer basket of the present invention taken at the line shown in FIG. 19.

Figure 25:
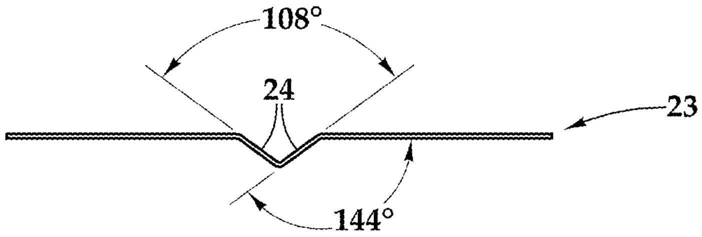
FIG. 25 is an end view of the grill top of the present invention.
Figure 26:
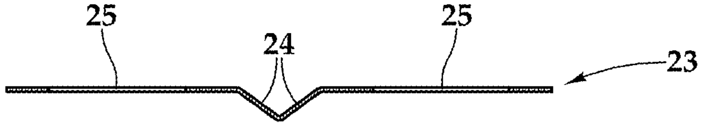
FIG. 26 is a section view of the grill top of the present invention taken at the line shown in FIG. 27.

FIG. 25 is an end view of the grill top of the present invention. As shown in this figure, the grill top 23 is comprised of a single flat sheet of metal that has been bent to form a downwardly extending V-shaped channel 24 in the center of the grill top. The V-shaped channel 24 forms an angle of approximately one hundred eight (108°) degrees, as noted on the figure. In a preferred embodiment, this angle is in the range of ninety to one hundred ten degrees. The rest of the grill top 23 is at an angle of one hundred thirty-five degrees) (135° relative to the bottom of the V-shaped channel 24, as noted on the figure. FIG. 26 is a section view of the grill top of the present invention taken at the line shown in FIG. 27.

Figure 27:
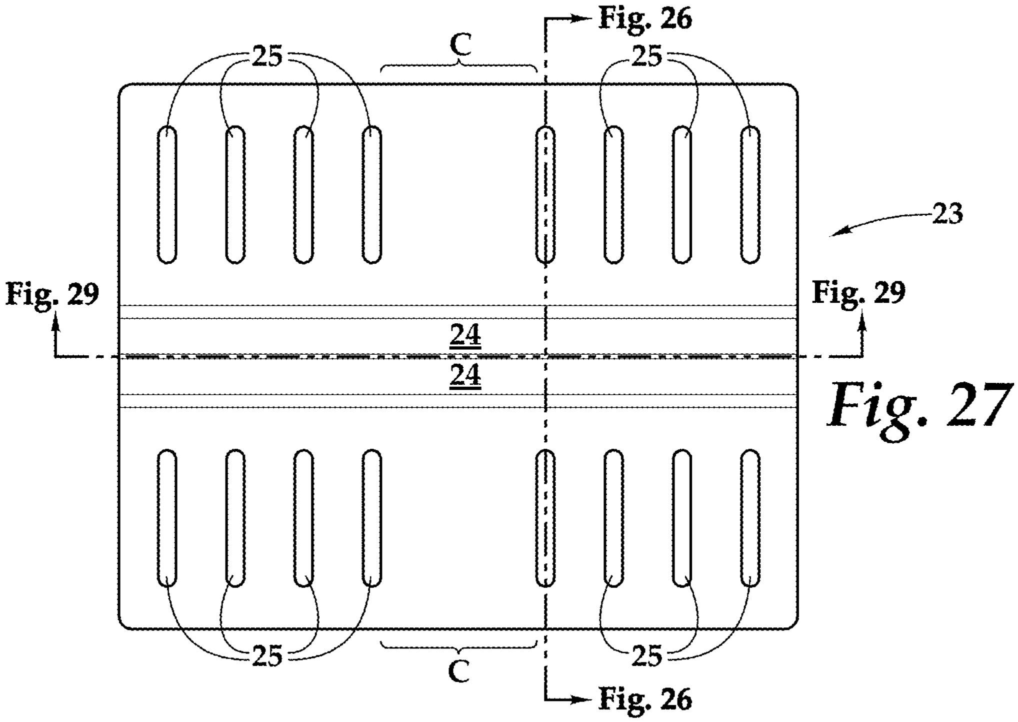
FIG. 27 is a top view of the grill top of the present invention.
Figure 28:
FIG. 28 is a side view of the grill top of the present invention.
Figure 29:
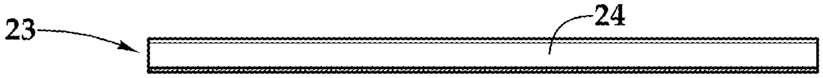
FIG. 29 is a section view of the grip top of the present invention taken at the line shown in FIG. 27.
Figure 30:
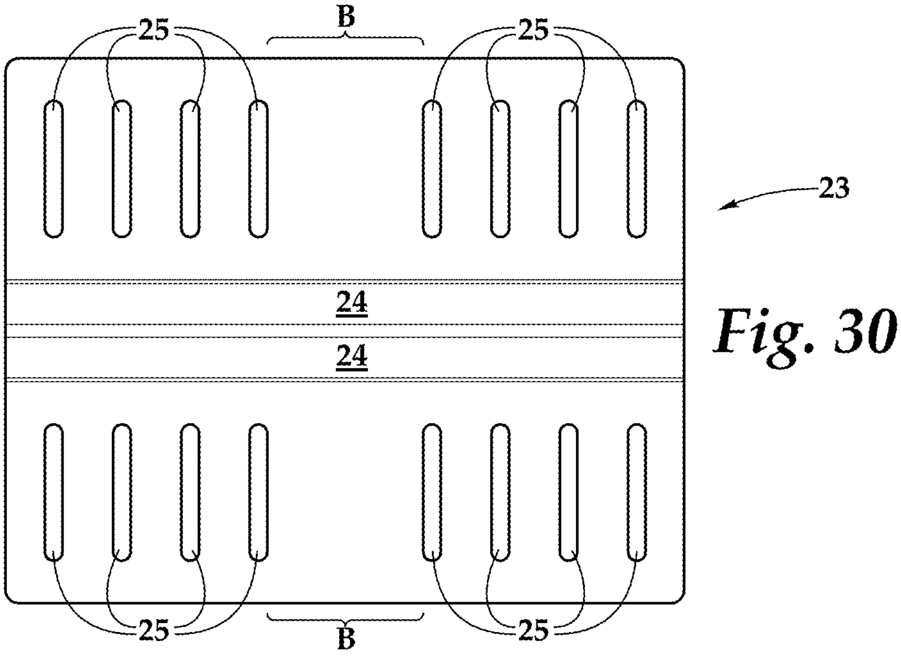
FIG. 30 is a bottom view of the grill top of the present invention.

FIGS. 27-30 are a top view of the grill top, a side view of the grill top, a section view of the grip top taken at the line shown in FIG. 27, and a bottom view of the grill top of the present invention, respectively. As shown in these figures, the grill top 23 comprises a plurality of slots 25 that run in a lateral direction (that is, top to bottom in FIGS. 27 and 30) and that are preferably arranged into four quadrants, with four slots per quadrant and no slots in the center part of the grill top (depicted with the letter "C" in FIG. 27).

Figure 31:
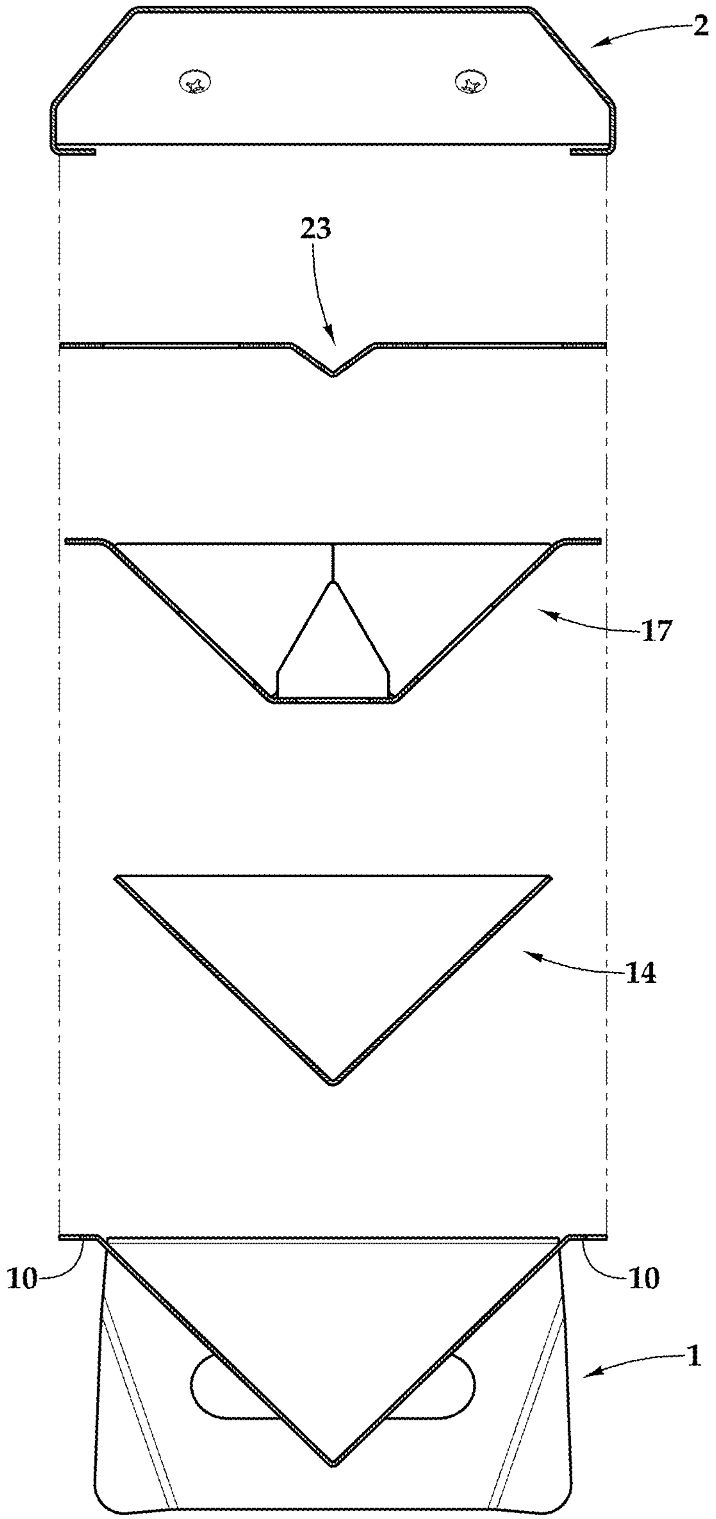
FIG. 31 is an exploded end view of the present invention showing the base member, fire box, steamer basket, grill top, and cover.

FIG. 31 is an exploded end view of the present invention showing the base member, fire box, steamer basket, grill top, and cover. As shown in this figure, when the invention is fully installed, the distance between the outside edges of the ledges 10 roughly equals the width (lateral) of the cover 2. When fully assembled, the fire box 14 fits into the V-shaped trough 3 of the base member 1, the steamer basket 17 rests inside of the fire box 14, the grill top 23 is situated on top of the steamer basket 17, and the rails 9 on the cover slide underneath the ledges 10 on the base member 1, thereby locking everything in place. As noted above, one end of the rails 9 (the is rounded, and the other end of the rails 9 is not (it is square), When sliding the cover onto the base member, a person would slide the rounded edge on first. Once the cover is in place on top of the base member, then a person can lift the entire unit by the handled on the rounded end of the rails, and the square end of the rails acts as a stop to prevent the cover from sliding off of the base member.

Figure 32:
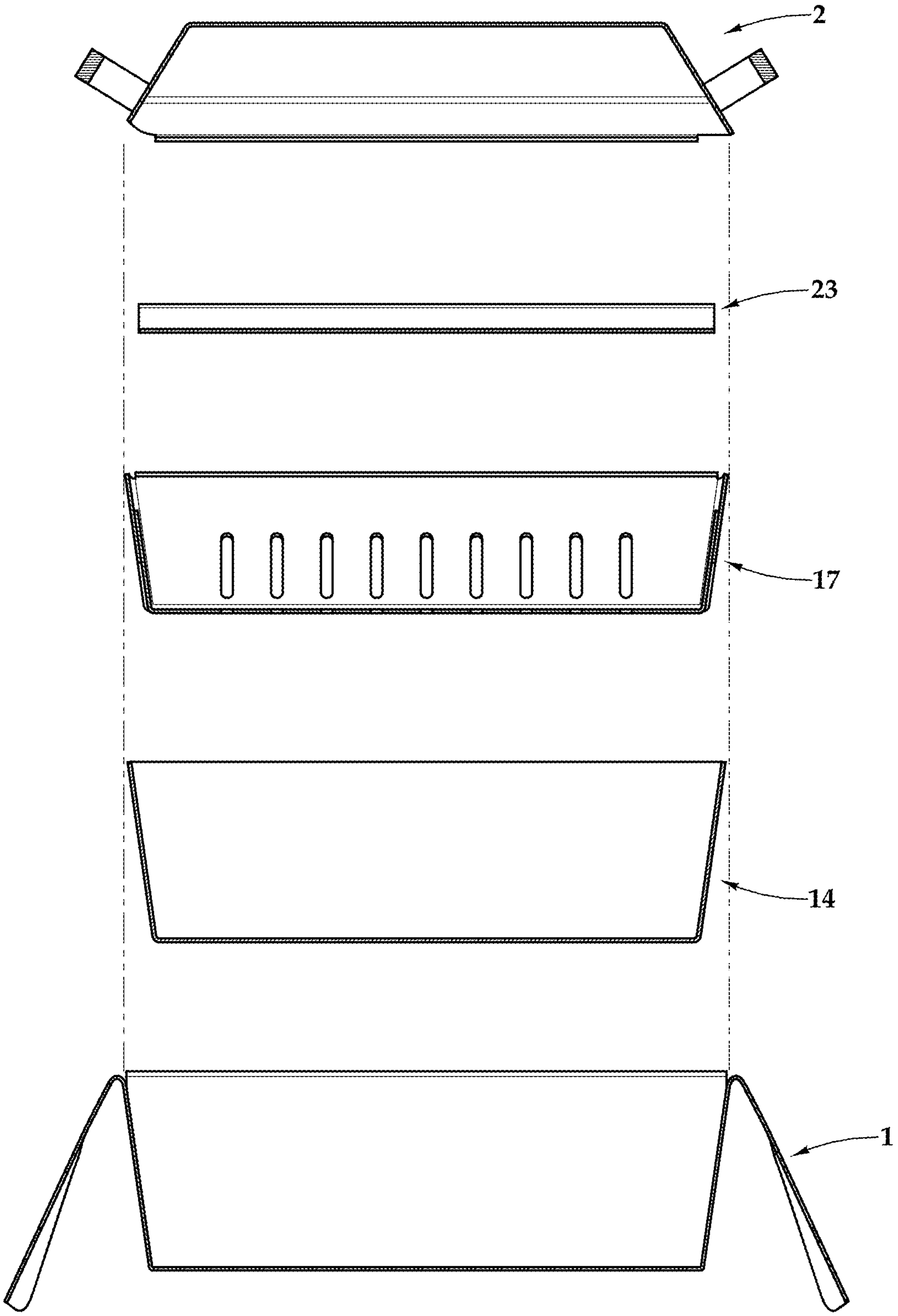
FIG. 32 is a longitudinal section view of the parts shown in FIG. 31.

FIG. 32 is a longitudinal section view of the parts shown in FIG. 31. As shown in this figure, the fire box 14 is approximately as deep (that is, from top to bottom) as the V-shaped trough 3 of the base member 1. The steamer basket 17 is less deep than the fire box 14. The V-shaped channel 24 in the grill top 23 is approximately one-fifth as deep as the steamer basket 17. The cover 2 is preferably less deep than the steamer basket 17. In this manner, all of the component parts fit neatly into (in the case of the fire box and steamer basket) and onto (in the case of the grill top) the base member 1 and are enclosed by the cover 2.

Figure 33:
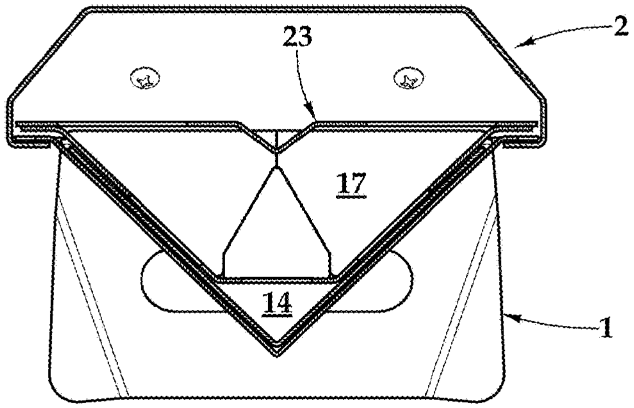
FIG. 33 is an end section view of the parts shown in FIG. 31 with the invention fully assembled.
Figure 34:
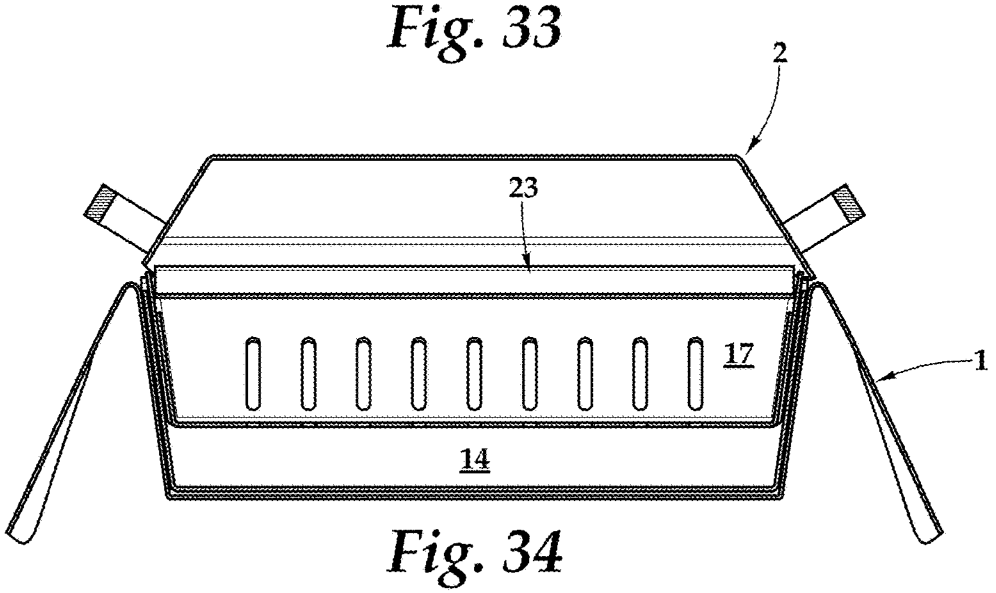
FIG. 34 is a longitudinal section view of the parts shown in FIG. 32 with the invention fully assembled.
Figure 35:
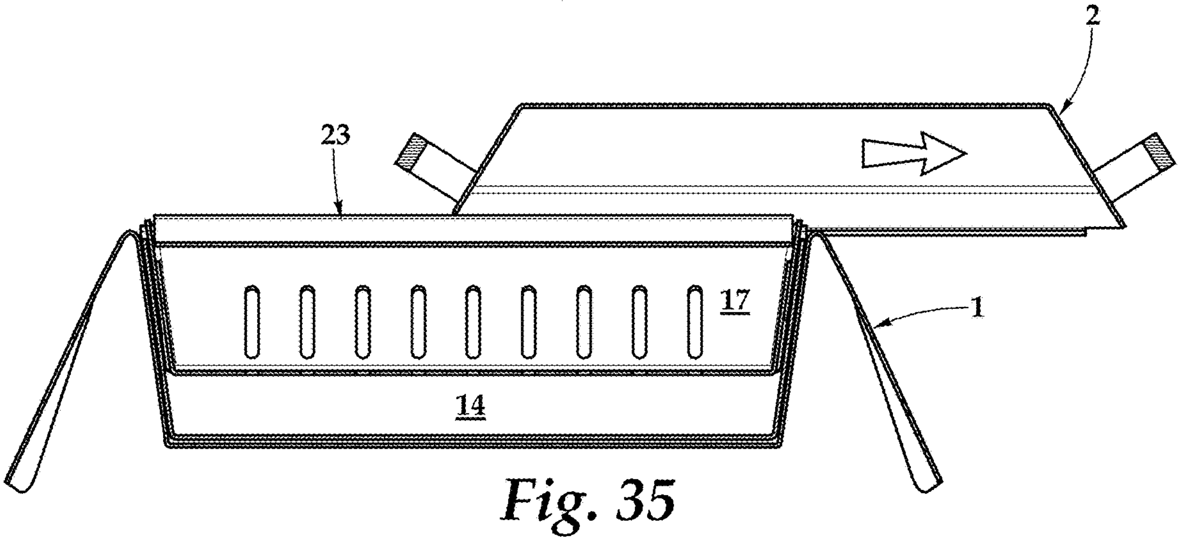
FIG. 35 is a longitudinal section view of the parts shown in FIG. 34 with the cover in a partially open position.

FIG. 33 is an end section view of the parts shown in FIG. 31 with the invention fully assembled. FIG. 34 is a longitudinal section view of the parts shown in FIG. 32 with the invention fully assembled. FIG. 35 is a longitudinal section view of the parts shown in FIG. 34 with the cover in a partially open position. These figures illustrate the compact nature of the present invention. As shown in FIG. 33, the V-shaped channel 24 in the grill top 23 is vertically aligned with the longitudinal axis of V-shaped trough 3 of the base member 1 and also with the longitudinal axis of the fire box 14. The cover 2 is preferably wider than the supporting members 4, In a preferred embodiment, the steamer basket 23 is approximately two-third (2/3) as deep as the fire box 14.

Figure 36:
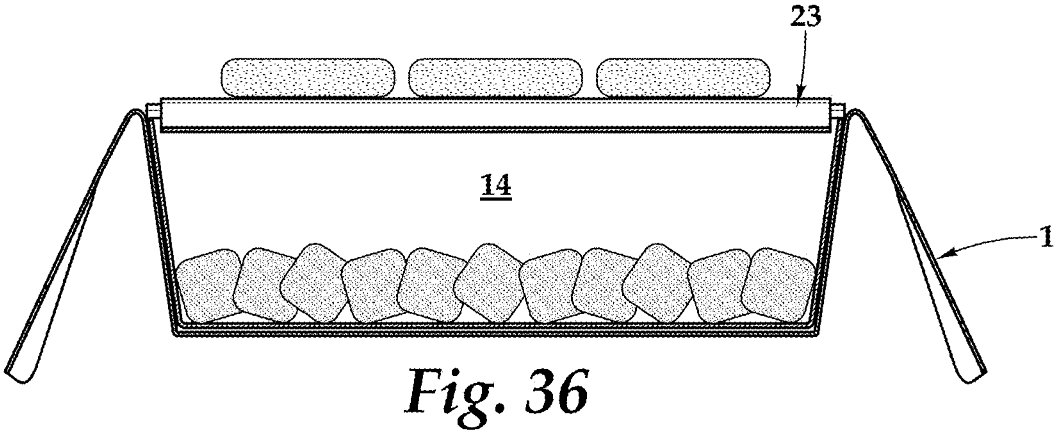
FIG. 36 is a longitudinal section view of the present invention shown with coals in the fire box and hamburger patties on the grill top.
Figure 37:
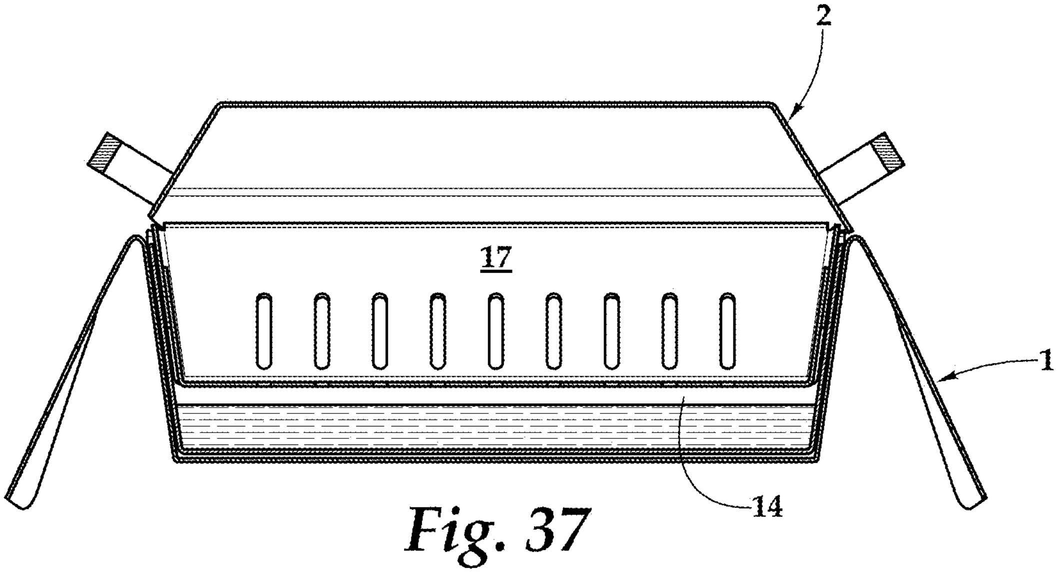
FIG. 37 is a longitudinal section view of the present invention shown with water in the fire box and the cover installed over the steamer basket.
Figure 38:
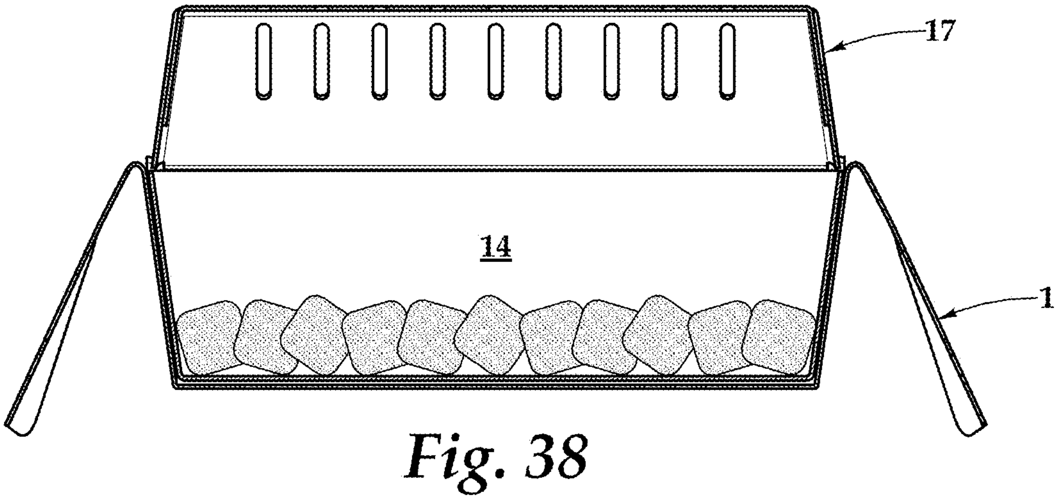
FIG. 38 is a longitudinal section view of the present invention shown with coals in the fire box and the steamer basket inverted and placed on top of the base member and fire box.

FIGS. 36-38 illustrate three different use cases for the present invention. FIG. 36 is a longitudinal section view of the present invention shown with coals in the fire box and hamburger patties on the grill top. In this configuration, the steamer basket and cover are not used, and the invention functions as a portable grill. FIG. 37 is a longitudinal section view of the present invention shown with water in the fire box and the cover installed over the steamer basket. In this configuration, the grill top is not used, and vegetables or other food items (not shown) may be placed into the steamer basket for steaming as the water in the fire box boils. In this case, the source of heat (which could be a fire, propane heater, or other source of heat) would be situated underneath the base member. FIG. 38 is a longitudinal section view of the present invention shown with coals in the fire box and the steamer basket inverted and placed on top of the base member and fire box. In this configuration, the invention is used as a space heater. The steamer basket is inverted and placed on top of the base member to contain sparks from the fire box.

Figure 39:
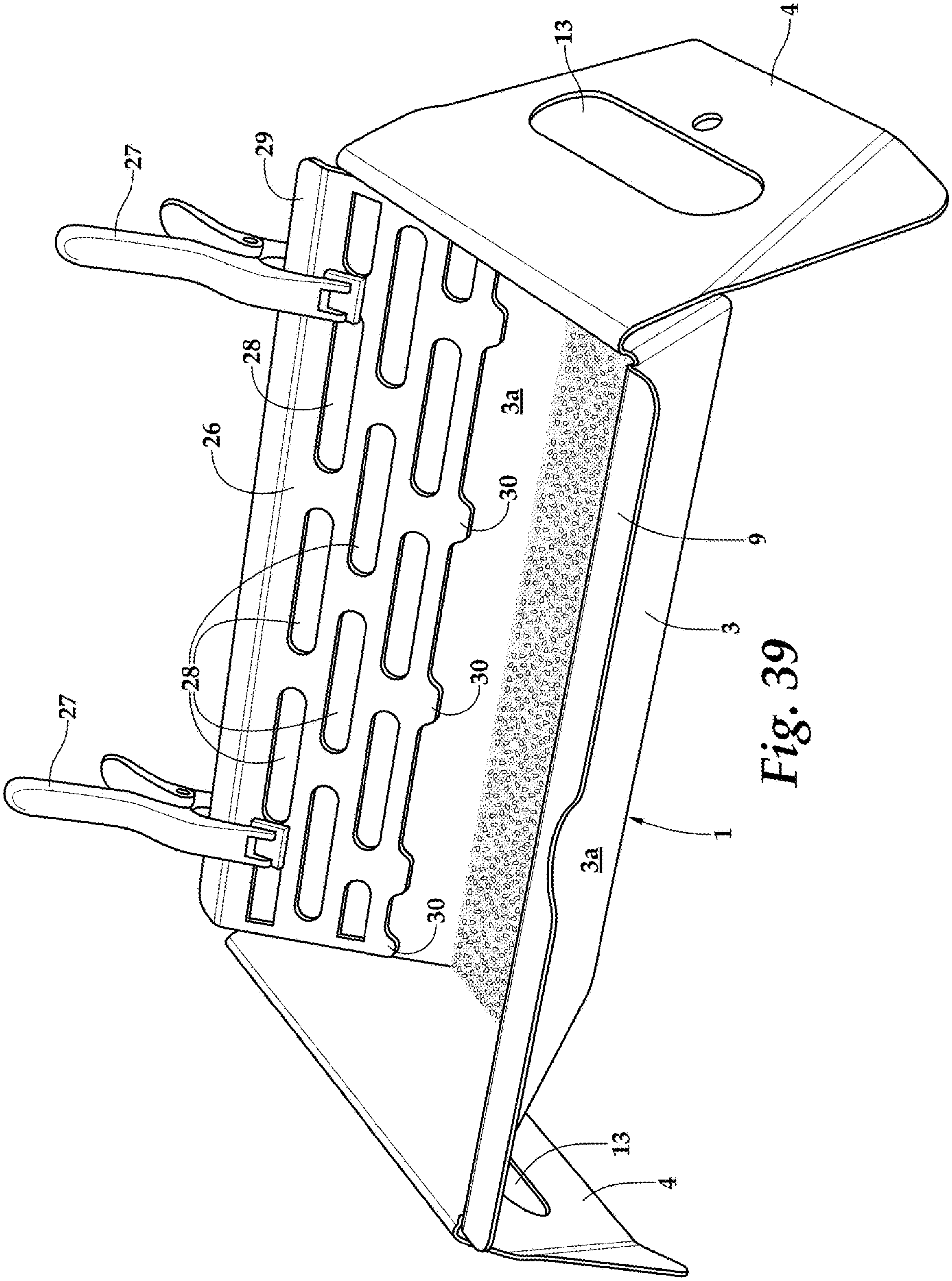
FIG. 39 is a perspective view of the present invention shown in a panning for gold configuration with the paydirt in the bottom of the base member.

FIGS. 39-45 illustrate an alternate use of the present invention in which it is used to pan for gold. As shown in FIG. 39, the present invention further comprises a sluice bar 26 that can be secured to one side of the V-shaped trough 3 with clips 27 (the clips 27 are not part of the present invention). The sluice bar 26 extends approximately halfway down one side of the V-shaped trough 3 and is preferably comprised of three rows of longitudinal slots 28. The longitudinal slots 28 in the second (or center) row are offset from the longitudinal slots 28 in the top and bottom rows. The sluice bar 26 further comprises a lip 29 that is configured to rest on top of one of the rails 9. Additionally, the sluice bar 26 comprises a protrusion 30 that extends downwardly (toward the bottom of the V-shaped trough 3) in between each longitudinal slot 28 on the bottom row of the sluice bar 26 and also at each end of the sluice bar 26. The purpose of the protrusions 30 is to direct the gold-bearing dirt (referred to herein as “paydirt”) and water into the horizontal slots 28 in the bottom row of the sluice bar 26.

To use the invention to pan for gold, a person would use the fire box 14 to scoop paydirt from the bed or bank of a stream and then deposit the paydirt into the steamer basket 17, which would have been placed over the base member 1 in the position shown in FIG. 34 (but without the cover 2). Next, the user would submerge the invention into the stream to add some water to the paydirt, lift the invention out of the stream, and shake it gently so that the larger particles remain the steamer basket 17 and the dirt and smaller particles fall into the V-shaped trough 3 of the base member 1. Next, the user would remove the steamer basket 17 and its contents and clip the sluice bar 26 onto one side of the V-shaped trough 3, as shown in FIG. 39.

Figure 40:
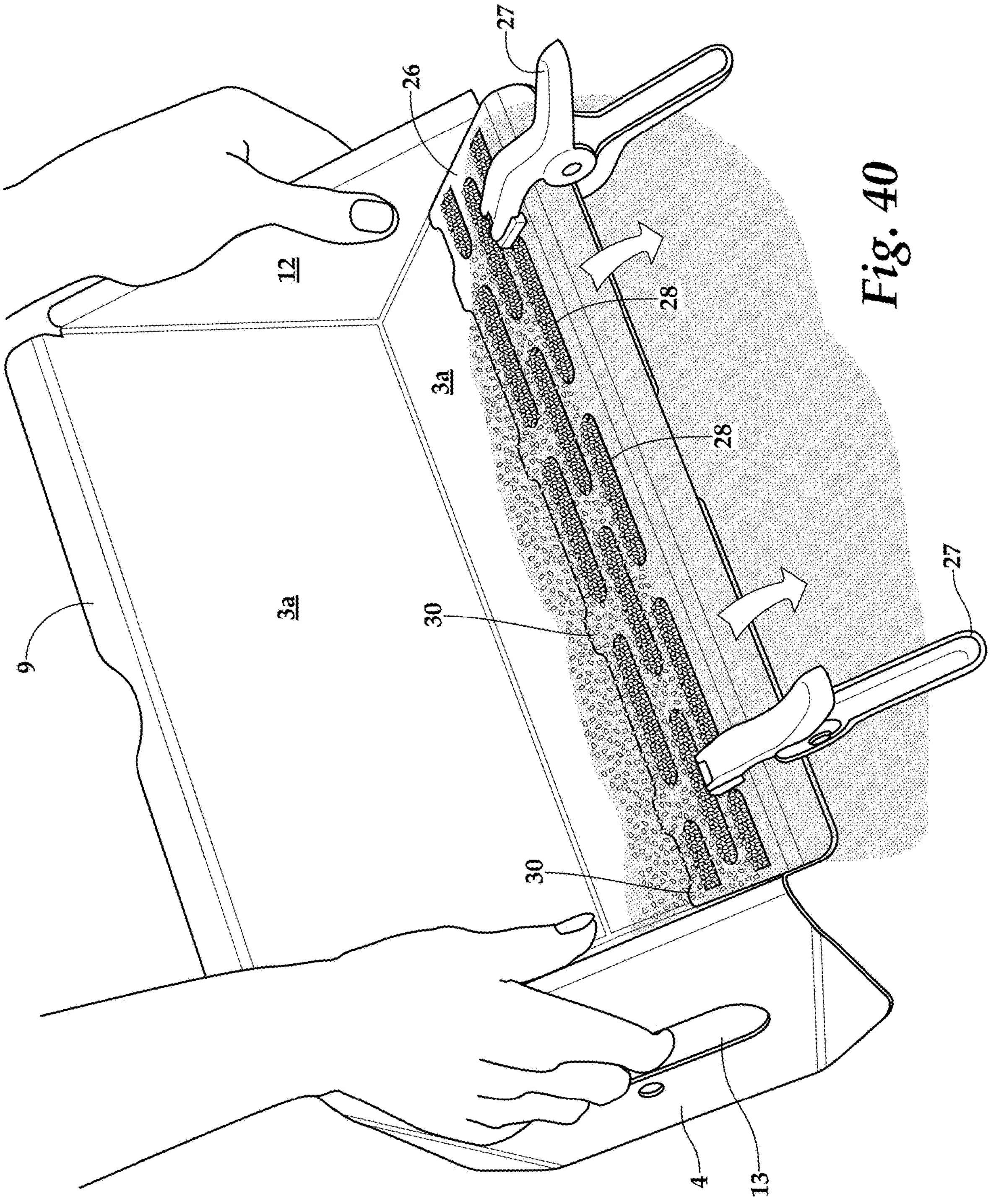
FIG. 40 is a perspective view of the present invention shown in a panning for gold configuration with the paydirt being passed over the sluice bar.
Figure 43:
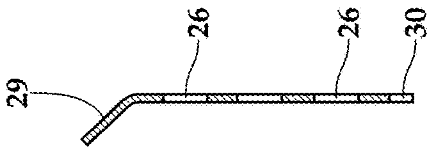
FIG. 43 is a section view of the sluice bar of the present invention.
Figure 41:
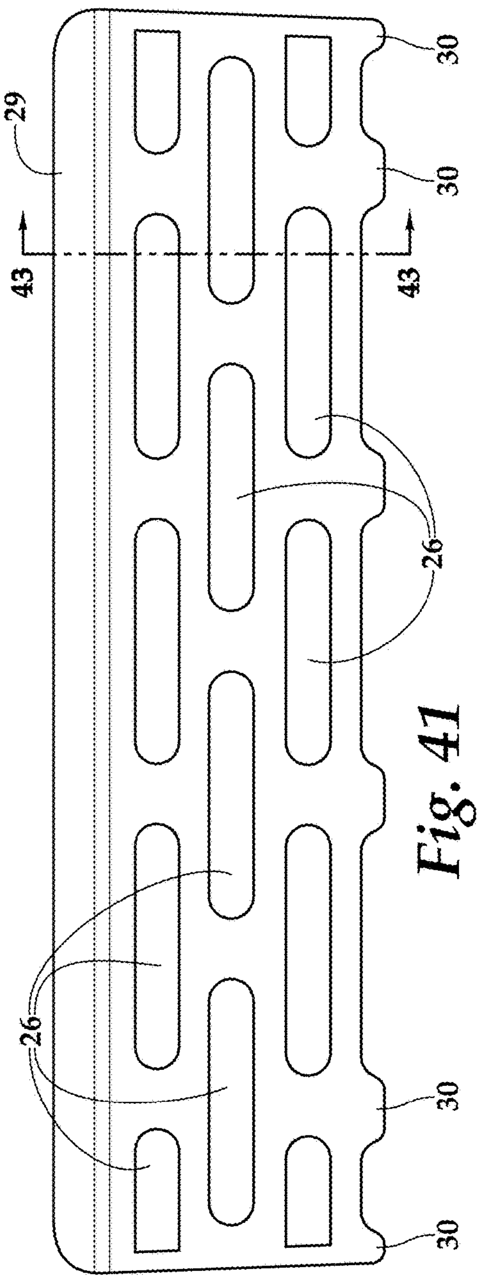
FIG. 41 is a plan view of the sluice bar of the present invention.
Figure 42:
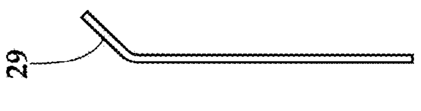
FIG. 42 is a side view of the sluice bar of the present invention.
Figure 45:
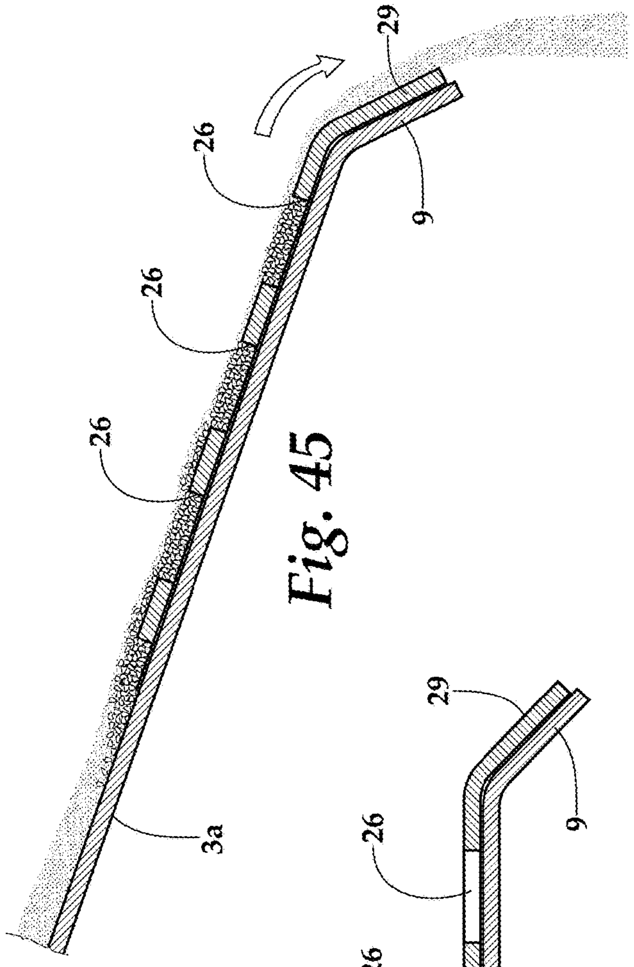
FIG. 45 is a section view of the sluice bar clipped to the base member with the gravel and gold having sunk into the crevices in the sluice bar and the water running off of the sluice bar.
Figure 44:
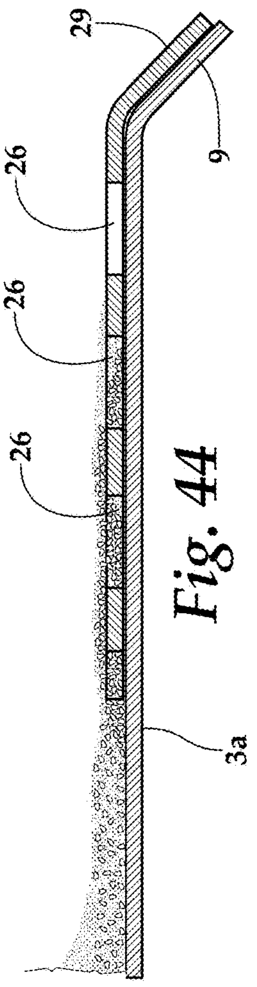
FIG. 44 is a section view of the sluice bar clipped to the base member with the gold-bearing gravel and water being moved over and across the sluice bar.

In FIG. 40, the user has tipped the invention to direct the paydirt and water over and onto the sluice bar 26, thereby causing the paydirt to drop down into the horizontal slots 28 and the water to run off the sluice bar 26 and over the lip 29. During this step, the user would agitate the invention gently so as to facilitate the separation of the paydirt from the water.

FIGS. 41-45 further illustrate the sluice bar and the process described above for panning for gold using the present invention. Once the water has flowed out of the invention, the user can unclip the sluice bar from the base member, remove the sluice bar, and inspect the remaining paydirt for gold. When the invention is fully assembled into the compact position shown in FIG. 1, the sluice bar 26 would be situated between the base member 1 and the fire box 14.

In a preferred embodiment, all of the parts of the present invention are made of food-grade stainless steel. The present invention does not requires any batteries, electric cords or solar panels, making it particularly suitable for outdoor use, although it may also be used indoors.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A portable cooking system and apparatus for panning gold comprising:

(a) a base member having an open top, the base member comprised of a V-shaped trough having first and second longitudinal ends, the base member further comprised of supporting member disposed on each of the first and second longitudinal ends of the V-shaped trough;

(b) a fire box that is configured to fit within the V-shaped trough of the base member;

(c) a steamer basket that is configured to fit within the base member on top of the fire box, the steamer basket comprising two side walls, each of which has a top edge, and a ledge that extends outwardly from and along the top edge of each of the two side walls of the steamer basket;

(d) a grill top that is configured to rest on top of ledges of the steamer basket and/or ledges of the V-shaped trough of the base member; and (e) a cover having first and second ends and a handle disposed on each of the first and second ends of the cover;

wherein the V-shaped trough is comprised of two flat plates with bottom edges, and wherein the bottom edges of the two flat plates of the V-shaped trough meet to form a center line of the V-shaped trough;

wherein a ledge extends outwardly from and along a top edge of each of two side walls of the V-shaped trough of the base member; and wherein the ledges of the steamer basket are configured to rest on top of the ledges of the V-shaped trough of the base member;

wherein the cover is rectangular in shape and comprised of a flat top plate, two side walls, and two end walls;

wherein each of the two end walls of the cover comprises a handle;

wherein each of the two side walls of the cover has a top part and a bottom part with first and second ends;

wherein the first end of the bottom part of each side wall of the cover is rounded;

wherein a rail extends inwardly from a bottom edge of the bottom part of each side wall of the cover and is configured to engage slidably with the ledge of the V-shaped trough of the base member; and wherein the second end of the bottom part of each side wall of the cover is configured to abut up against one end of the ledge on the V-shaped trough of the base member.

2. The portable cooking system and apparatus for panning gold of claim 1, wherein each rail is parallel to the flat top plate of the cover.

3. The portable cooking system and apparatus for panning gold of claim 1, further comprising a recess in a center of each ledge of the V-shaped trough of the base member.

4. A portable cooking system and apparatus for panning gold comprising:

(a) a base member having an open top, the base member comprised of a V-shaped trough having first and second longitudinal ends, the base member further comprised of supporting member disposed on each of the first and second longitudinal ends of the V-shaped trough;

(b) a fire box that is configured to fit within the V-shaped trough of the base member;

(c) a steamer basket that is configured to fit within the base member on top of the fire box, the steamer basket comprising two side walls, each of which has a top edge, and a ledge that extends outwardly from and along the top edge of each of the two side walls of the steamer basket;

(d) a grill top that is configured to rest on top of ledges of the steamer basket and/or ledges of the V-shaped trough of the base member; and e) a cover having first and second ends and a handle disposed on each of the first and second ends of the cover;

wherein the V-shaped trough is comprised of two flat plates with bottom edges, and wherein the bottom edges of the two flat plates of the V-shaped trough meet to form a center line of the V-shaped trough;

wherein a ledge extends outwardly from and along a top edge of each of two side walls of the V-shaped trough of the base member; and wherein the ledges of the steamer basket are configured to rest on top of the ledges of the V-shaped trough of the base member;

wherein the steamer basket is in the shape of a trough with a flat bottom piece, two end walls, and two side walls that extend upwardly and outwardly from the flat bottom piece;

wherein the flat bottom piece and the two side walls of the steamer basket comprise a plurality of laterally extending slots.

5. A portable cooking system and apparatus for panning gold comprising:

(a) a base member having an open top, the base member comprised of a V-shaped trough having first and second longitudinal ends, the base member further comprised of supporting member disposed on each of the first and second longitudinal ends of the V-shaped trough;

(b) a fire box that is configured to fit within the V-shaped trough of the base member;

(c) a steamer basket that is configured to fit within the base member on top of the fire box, the steamer basket comprising two side walls, each of which has a top edge, and a ledge that extends outwardly from and along the top edge of each of the two side walls of the steamer basket;

(d) a grill top that is configured to rest on top of ledges of the steamer basket and/or ledges of the V-shaped trough of the base member; and (e) a cover having first and second ends and a handle disposed on each of the first and second ends of the cover;

wherein the V-shaped trough is comprised of two flat plates with bottom edges, and wherein the bottom edges of the two flat plates of the V-shaped trough meet to form a center line of the V-shaped trough;

wherein a ledge extends outwardly from and along a top edge of each of two side walls of the V-shaped trough of the base member; and wherein the ledges of the steamer basket are configured to rest on top of the ledges of the V-shaped trough of the base member;

wherein the grill top is comprised of a single flat sheet of metal that is bent to form a downwardly extending V-shaped channel in a center of the grill top.

6. The portable cooking system and apparatus for panning gold of claim 5, wherein the grill top comprises a plurality of lateral slots that are arranged into four quadrants with no slots in the V-shaped channel in the center of the grill top.

7. A portable cooking system and apparatus for panning gold comprising:

(a) a base member having an open top, the base member comprised of a V-shaped trough having first and second longitudinal ends, the base member further comprised of supporting member disposed on each of the first and second longitudinal ends of the V-shaped trough;

(b) a fire box that is configured to fit within the V-shaped trough of the base member;

(c) a steamer basket that is configured to fit within the base member on top of the fire box, the steamer basket comprising two side walls, each of which has a top edge, and a ledge that extends outwardly from and along the top edge of each of the two side walls of the steamer basket;

(d) a grill top that is configured to rest on top of ledges of the steamer basket and/or ledges of the V-shaped trough of the base member; and (e) a cover having first and second ends and a handle disposed on each of the first and second ends of the cover;

wherein the V-shaped trough is comprised of two flat plates with bottom edges, and wherein the bottom edges of the two flat plates of the V-shaped trough meet to form a center line of the V-shaped trough;

wherein a ledge extends outwardly from and along a top edge of each of two side walls of the V-shaped trough of the base member; and wherein the ledges of the steamer basket are configured to rest on top of the ledges of the V-shaped trough of the base member;

further comprising a sluice bar that is configured to fit along an inside surface of one of the two side walls of the V-shaped trough of the base member;

wherein the sluice bar comprises a lip along a top edge of the sluice bar, the lip being configured to rest on top of the ledge along one of the two side walls of the V-shaped trough of the base member.

8. The portable cooking system and apparatus for panning gold of claim 7, wherein the sluice bar comprises three rows of longitudinal slots, each row of longitudinal slots being comprised of at least three longitudinal slots;

wherein the longitudinal slots in a middle row are offset from the longitudinal slots in a top row and the longitudinal slots in a bottom row.

9. The portable cooking system and apparatus for panning gold of claim 8, wherein the sluice bar comprises a plurality of protrusions that extend downwardly in between each longitudinal slot on the bottom row and at each end of the sluice bar.

* * * * *